United States Patent
Ahlawat et al.

(10) Patent No.: US 9,819,136 B2
(45) Date of Patent: Nov. 14, 2017

(54) GAS MIXTURE CONTROL IN A GAS DISCHARGE LIGHT SOURCE

(71) Applicant: Cymer, LLC, San Diego, CA (US)

(72) Inventors: Rahul Ahlawat, San Diego, CA (US); Tanuj Aggarwal, San Diego, CA (US)

(73) Assignee: Cymer, LLC, San Diego, CA (US)

(*) Notice: Subject to any disclaimer, the term of this patent is extended or adjusted under 35 U.S.C. 154(b) by 69 days.

(21) Appl. No.: 15/132,803

(22) Filed: Apr. 19, 2016

(65) Prior Publication Data
US 2017/0201057 A1  Jul. 13, 2017

Related U.S. Application Data

(60) Provisional application No. 62/276,522, filed on Jan. 8, 2016.

(51) Int. Cl.
| | |
|---|---|
| *H01S 3/036* | (2006.01) |
| *H01S 3/097* | (2006.01) |
| *H01S 3/225* | (2006.01) |

(52) U.S. Cl.
CPC .............. *H01S 3/036* (2013.01); *H01S 3/097* (2013.01); *H01S 3/225* (2013.01); *H01S 3/2251* (2013.01); *H01S 3/2253* (2013.01); *H01S 3/2255* (2013.01); *H01S 3/2256* (2013.01); *H01S 3/2258* (2013.01)

(58) Field of Classification Search
CPC ........ H01S 3/036; H01S 3/225; H01S 3/2251; H01S 3/2253; H01S 3/2255; H01S 3/2256; H01S 3/2258
See application file for complete search history.

(56) References Cited

U.S. PATENT DOCUMENTS

| | | | |
|---|---|---|---|
| 6,331,994 B1* | 12/2001 | Ohmi ................. | H01S 3/08 372/100 |
| 6,690,702 B1* | 2/2004 | Ohmi ................. | H01S 3/225 372/35 |
| 6,727,731 B1* | 4/2004 | Rebhan .............. | G03F 7/70025 327/25 |
| 8,411,720 B2* | 4/2013 | O'Brien ............. | H01S 3/104 372/55 |
| 9,130,337 B1 | 9/2015 | O'Brien et al. | |
| 2016/0205758 A1* | 7/2016 | Bezel ................. | H05G 2/003 250/504 R |

* cited by examiner

*Primary Examiner* — Kinam Park
(74) *Attorney, Agent, or Firm* — DiBerardino McGovern IP Group LLC

(57) ABSTRACT

A gas discharge light source includes a gas discharge system that includes one or more gas discharge chambers. Each of the gas discharge chambers in the gas discharge system is filled with a respective gas mixture. For each gas discharge chamber, a pulsed energy is supplied to the respective gas mixture by activating its associated energy source to thereby produce a pulsed amplified light beam from the gas discharge chamber. One or more properties of the gas discharge system are determined. A gas maintenance scheme is selected from among a plurality of possible schemes based on the determined one or more properties of the gas discharge system. The selected gas maintenance scheme is applied to the gas discharge system. A gas maintenance scheme includes one or more parameters related to adding one or more supplemental gas mixtures to the gas discharge chambers of the gas discharge system.

37 Claims, 7 Drawing Sheets

GAS MIXTURE CONTROL IN A GAS DISCHARGE LIGHT SOURCE

CROSS REFERENCE TO RELATED APPLICATION

This application claims the benefit of U.S. Provisional Application No. 62/276,522, filed Jan. 8, 2016 and titled GAS MIXTURE CONTROL IN A GAS DISCHARGE LIGHT SOURCE, which is incorporated herein by reference in its entirety.

TECHNICAL FIELD

The disclosed subject matter relates to controlling a gas mixture in a gas discharge light source that produces a pulsed light beam.

BACKGROUND

One type of gas discharge light source used in photolithography is known as an excimer light source or laser. An excimer laser typically uses a combination of a noble gas, such as argon, krypton, or xenon, and a reactive such as fluorine or chlorine. The excimer laser derives its name from the fact that under the appropriate condition of electrical stimulation (energy supplied) and high pressure (of the gas mixture), a pseudo-molecule called an excimer is created, which only exists in an energized state and gives rise to amplified light in the ultraviolet range.

Excimer light sources are used in photolithography machines. The excimer light source produces deep ultraviolet (DUV) light. An excimer light source can be built using a single gas discharge chamber or using a plurality of gas discharge chambers.

SUMMARY

In some general aspects, a gas discharge light source includes a gas discharge system that includes one or more gas discharge chambers, each gas discharge chamber housing an energy source. The gas discharge light source is operated. Each of the gas discharge chambers in the gas discharge system is filled with a respective gas mixture. For each gas discharge chamber, a pulsed energy is supplied to the respective gas mixture by activating its energy source to thereby produce a pulsed amplified light beam from the gas discharge chamber. One or more properties of the gas discharge system are determined. A gas maintenance scheme is selected from among a plurality of possible schemes based on the determined one or more properties of the gas discharge system. The selected gas maintenance scheme is applied to the gas discharge system. A gas maintenance scheme includes one or more parameters related to adding one or more supplemental gas mixtures to the gas discharge chambers of the gas discharge system.

Implementations can include one or more of the following features. For example, the one or more properties of the gas discharge system can be determined by determining one or more properties of each of the gas discharge chambers in the gas discharge system.

The selected gas maintenance scheme can be applied to the gas discharge system by applying the selected gas maintenance scheme to each of the gas discharge chambers of the gas discharge system.

The gas discharge system can include two gas discharge chambers.

The gas discharge chamber can be filled with the respective gas mixture by filling the gas discharge chamber with a mixture of a gain medium and a buffer gas. The gas discharge chamber can be filled with the mixture of the gain medium and the buffer gas by filling the gas discharge chamber with a gain medium that includes a noble gas and a halogen, and a buffer gas that includes an inert gas. The noble gas can include argon, krypton, or xenon; the halogen can include fluorine; and the inert gas can include helium or neon.

The pulsed energy can be supplied to a respective gas mixture by activating its energy source by applying a pulsed voltage to a pair of electrodes within the gas discharge chamber so that an electrical stimulation is applied to a halogen within the gas mixture.

The one or more properties of the gas discharge system can be determined by determining an age of at least one of the gas discharge chambers of the gas discharge system based on one or more of: how many times that gas discharge chamber has been filled with the gas mixture and how often the energy source of that gas discharge chamber has been activated.

The one or more properties of the gas discharge system can be determined, the gas maintenance scheme can be selected, and the selected gas maintenance scheme can be applied to the gas discharge system while pulsed energy is being supplied to the gas mixture of the one or more gas discharge chambers. The one or more properties of the gas discharge system can be determined, the gas maintenance scheme can be selected, and the selected gas maintenance scheme can be applied to the gas discharge system while pulsed energy is not being supplied to the gas mixture of any of the gas discharge chambers.

The gas maintenance scheme can be selected from among the plurality of possible gas maintenance schemes by selecting a standard gas injection scheme if it is determined that an age of at least one of the gas discharge chambers is in a first range, and the selected gas injection scheme can be applied to the gas discharge system by pumping at least a first amount of a buffer gas into the gas mixture of the at least one gas discharge chamber. The gas maintenance scheme can be selected from among the plurality of possible gas maintenance schemes by selecting a conservation gas injection scheme if it is determined that an age of the at least one gas discharge chamber is in a second range. The selected conservation gas injection scheme can be applied to the gas discharge system by pumping a second amount of the buffer gas into the gas mixture of the at least one gas discharge chamber, the second amount being lower than the first amount. The gas maintenance scheme can be selected from among the plurality of possible gas maintenance schemes by selecting another conservation gas injection scheme if it is determined that an age of the at least one gas discharge chamber is in a third range. The selected gas injection scheme can be applied to the gas discharge system by pumping a third amount of the buffer gas into the gas mixture of the at least one gas discharge chamber, the third amount being lower than the first amount but greater than the second amount.

The first range can be a value less than or equal to a lower value, the second range can be a value greater than the lower value, and the third range can be a value that is greater than an upper value. The first range can be a first value of the age, the second range can be a second value of the age, and the third range can be a third value of the age.

The first range can be a first value of the age and the second range can be a second value of the age. The second range can be distinct from the first range.

The gas maintenance scheme can be selected from among the plurality of possible gas maintenance schemes by selecting a standard gas injection scheme if it is determined that an age of at least one of the gas discharge chambers is in a first range. The selected gas injection scheme can be applied to the gas discharge system by performing an injection of a buffer gas into the gas mixture of the at least one gas discharge chamber at a first temporal frequency. And, gas maintenance scheme can be selected from among the plurality of possible gas maintenance schemes by selecting a conservation gas injection scheme if it is determined that the age of the at least one gas discharge chamber is in a second range. The selected conservation gas injection scheme can be applied to the gas discharge system by performing an injection of the buffer gas into the gas mixture of the at least one gas discharge chamber at a second temporal frequency that is different from the first temporal frequency.

The second temporal frequency can be less than the first temporal frequency. An injection of the buffer gas into the gas mixture of the at least one gas discharge chamber can be performed by also injecting one or more components of the gain medium into the gas mixture of the at least one gas discharge chamber.

The method can also include monitoring one or more operating characteristics of the gas discharge light source; determining whether any of the one or more monitored operating characteristics will be out of an acceptable range at a future time; and, if it is determined that any of the one or more monitored operating characteristics will be out of an acceptable range at a future time, then: selecting a restore gas maintenance scheme and applying the selected restore gas maintenance scheme to the gas discharge system.

The selected restore gas maintenance scheme can be applied to the gas discharge system by applying one or more of a restore injection scheme and a refill scheme to the gas discharge system. The selected restore injection scheme can be applied to the gas discharge system by performing an injection of a buffer gas into the gas mixture of at least one of the gas discharge chambers that increases a relative amount of the buffer gas in the gas mixture of the at least one gas discharge chamber. The injection of the buffer gas into the gas mixture can be performed by one or more of altering a temporal frequency at which the injection is performed and pumping a different amount of buffer gas into the gas mixture than was pumped before it was determined that any of the one or more monitored operating characteristics will be out of an acceptable range.

The temporal frequency at which the injection is performed can be altered by increasing a frequency at which the injection is performed; and the different amount of buffer gas can be pumped into the gas mixture by pumping less buffer gas into the gas mixture than was pumped before it was determined that any of the one or more monitored operating characteristics will be out of an acceptable range.

The selected gas maintenance scheme can be applied to the gas discharge system by applying the selected gas maintenance scheme after each of the gas discharge chambers is filled with its respective gas mixture. The method can also include, after the selected gas maintenance scheme is applied to the gas discharge system, performing a refill scheme to the gas discharge chamber. The refill scheme can include emptying each of the gas discharge chambers of the gas discharge system; and refilling each gas discharge chamber with fresh gas mixture.

The gas maintenance scheme can include one or more of the following parameters: an amount of a component gas that is to be pumped into the gas mixture; and a temporal frequency at which an injection of the component gas into the gas mixture is performed. The component gas can be a buffer gas (such as an inert gas) of the gas mixture, and the gas mixture can include a gain medium.

One of the gas maintenance schemes can be a refill scheme that includes emptying at least one of the gas discharge chambers and refilling that emptied gas discharge chamber with fresh gas mixture.

In other general aspects, a gas discharge light source that includes one or more gas discharge chambers is operated. A gas discharge chamber is filled with a gas mixture, the gas discharge chamber housing an energy source. A pulsed energy is supplied to the gas mixture by activating the energy source to thereby produce a pulsed amplified light beam. One or more properties of the gas discharge chamber are determined, and an injection scheme is selected from among a plurality of possible injection schemes based on the determined one or more properties of the gas discharge chamber. The selected injection scheme is applied to the gas discharge chamber. An injection scheme includes one or more parameters related to adding one or more supplemental gas mixtures to the gas discharge chamber.

In other general aspects, a gas discharge light source includes: a gas discharge system that includes one or more gas discharge chambers, each gas discharge chamber housing an energy source and containing a gas mixture that includes a gain medium; and a gas maintenance system. The gas maintenance system includes a gas supply system; a monitoring system; and a control system coupled to the gas supply system and to the monitoring system. The control system is configured to: provide a signal to activate each energy source to thereby produce a pulsed amplified light beam from its gas discharge chamber; receive information from the monitoring system and determine one or more properties of the gas discharge system based on this received information; select a gas maintenance scheme from among a plurality of possible schemes based on the determined one or more properties of the gas discharge system; and provide a signal to the gas supply system to thereby apply the selected gas maintenance scheme to the gas discharge system. A gas maintenance scheme includes one or more parameters related to adding one or more supplemental gas mixtures to the gas discharge chambers of the gas discharge system.

In other general aspects, a gas discharge light source is operated using a method. The gas discharge light source includes a gas discharge system that includes one or more gas discharge chambers, each gas discharge chamber housing an energy source. The method includes: filling each of the gas discharge chambers in the gas discharge system with a respective gas mixture; for each gas discharge chamber, supplying a pulsed energy to the respective gas mixture by activating its energy source to thereby produce a pulsed amplified light beam from the gas discharge chamber; monitoring one or more operating characteristics of the gas discharge light source; determining whether any of the one or more monitored operating characteristics will be out of an acceptable range at a future time; and if it is determined that any of the one or more monitored operating characteristics would be out of an acceptable range at the future time, then selecting a restore gas maintenance scheme and applying the selected restore gas maintenance scheme to the gas discharge system by increasing a relative amount a component gas in the gas mixture of at least one of the gas discharge chambers.

Implementations can include one or more of the following features. For example, the component gas can include a buffer gas such as, for example, an inert gas such as neon.

A relative amount of the component gas in the gas mixture of at least one of the gas discharge chambers can be increased by applying a restore gas injection scheme to the at least one gas discharge chamber. The restore injection scheme can be applied by increasing a temporal frequency at which an injection of the component gas is performed. The restore injection scheme can be applied by pumping more component gas into the gas mixture of the at least one gas discharge chamber than was pumped before it was determined that any of the one or more monitored operating characteristics will be out of an acceptable range. Or, the restore injection scheme can be applied by both increasing a temporal frequency at which an injection of the component gas is performed and pumping more component gas into the gas mixture of the at least one gas discharge chamber than was pumped before it was determined that any of the one or more monitored operating characteristics will be out of an acceptable range.

The one or more operating characteristics of the gas discharge light source can be monitored by monitoring one or more of: a pulsed energy that is supplied to the gas mixture of at least one of the gas discharge chambers; and an energy of the pulsed amplified light beam output from at least one of the gas discharge chambers. The one or more operating characteristics can be monitored by measuring one or more of the following characteristics of the gas discharge light source: a change in the pulsed energy supplied to the gas mixture of at least one of the gas discharge chambers over time; and a change in the energy of the pulsed amplified light beam output from at least one of the gas discharge chambers over time.

One or more operating characteristics of the gas discharge light source can be monitored by calculating values of the operating characteristics, and determining whether any of the one or more monitored operating characteristics will be out of the acceptable range at a future time comprises determining whether any of the calculated values of the operating characteristics will be out of the acceptable range at a future time. The values of the operating characteristics can be calculated by calculating average values of the operating characteristics.

A relative amount of the component gas in the gas mixture of at least one of the gas discharge chambers can be increased by applying a refill scheme to the at least one gas discharge chamber. The refill scheme includes: purging the gas mixture from the at least one gas discharge chamber and filling the at least one gas discharge chamber with a fresh gas mixture that includes the component gas.

Determining whether any of the one or more monitored operating characteristics will be out of the acceptable range at a future time can include determining whether any of the one or more monitored operating characteristics is likely to be out of the acceptable range at a future time.

Determining whether any of the one or more monitored operating characteristics will be out of the acceptable range at a future time can include: determining a rate of change of each of the one or more monitored operating characteristics; and determining whether the rate of change for each of the one or more monitored operating characteristics indicates whether that monitored operating characteristic is likely to be out of the acceptable range at the future time.

The method can include determining whether any of the one or more monitored operating characteristics will be out of another acceptable range at a future time, and if it is determined that any of the one or more monitored operating characteristics will be out of the other acceptable range at a future time, then applying a refill scheme to at least one gas discharge chamber. The refill scheme includes: purging the gas mixture from the at least one of the gas discharge chambers, and filling the purged gas discharge chamber with fresh gas mixture that includes the component gas.

The one or more operating characteristics of the gas discharge light source can be monitored while the pulsed amplified light beam is produced.

The gas discharge system can include a first gas discharge chamber housing a first energy source and a second gas discharge chamber housing a second energy source. Each of the gas discharge chambers can be filled with a respective gas mixture by filling the first gas discharge chamber with a first gas mixture and filling the second gas discharge chamber with a second gas mixture. The selected restore gas maintenance scheme can be applied to the gas discharge system by increasing a relative amount of a component gas in a first gas mixture of the first gas discharge chamber and increasing a relative amount of a component gas in a second gas mixture of the second gas discharge chamber.

The gas discharge chamber can be filled with the respective gas mixture by filling the gas discharge chamber with a mixture of a gain medium and a buffer gas. The gas discharge chamber can be filled with the mixture of the gain medium and the buffer gas by filling the gas discharge chamber with a gain medium that includes a noble gas and a halogen, and a buffer gas that includes an inert gas. The inert gas can include helium or neon and the component gas can include the inert gas.

In other general aspects, a gas discharge light source includes a gas discharge system that includes one or more gas discharge chambers, each gas discharge chamber housing an energy source and containing a gas mixture that includes a gain medium; and a gas maintenance system. The gas maintenance system includes a gas supply system; a monitoring system; and a control system coupled to the gas supply system and to the monitoring system. The control system is configured to: provide a signal to activate each energy source to thereby produce a pulsed amplified light beam from its gas discharge chamber; receive information from the monitoring system and determine one or more operating characteristics of the gas discharge system based on this received information; determine whether any of the operating characteristics will be out of an acceptable range at a future time; and if it is determined that any of the operating characteristics will be out of an acceptable range at a future time, then selecting a restore gas maintenance scheme and providing a signal to the gas supply system to thereby apply the selected restore gas maintenance scheme to the gas discharge system. The restore gas maintenance scheme increases a relative amount of a component gas in the gas mixture of at least one of the gas discharge chambers.

The method and system described herein effectively and continuously determine whether the gas component could be conserved at any given time based on the age of the gas discharge chamber. The implementation of the method and system can lead to a direct reduction of the gas component (such as neon) by at least 50% and potentially as much as 75% when compared with a method and system that lacks a gas conservation scheme. Conservation of the gas component is done with the comfort of knowing that a restore gas maintenance system is in use that monitors whether the gas conservation scheme will lead to an unacceptable reduction in quality of the output of the gas discharge chamber at a future time. The method and system described herein therefore reduces the volume requirements for the gas component and can save the customer who purchases the system (and method) hundreds of thousands of dollars for each gas discharge light source 100.

DESCRIPTION

Figure 1:
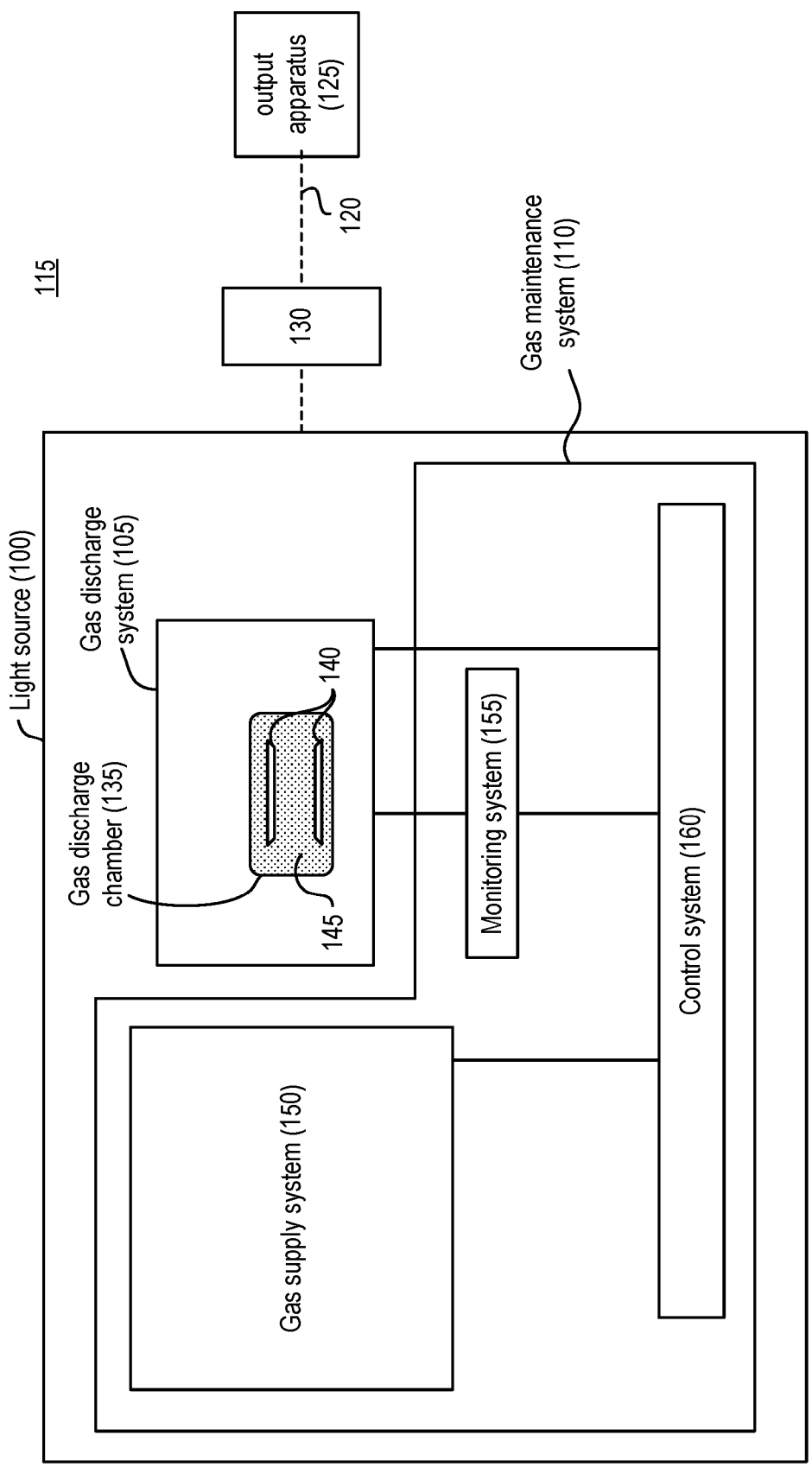
FIG. 1 is a block diagram of a gas discharge light source that produces a pulsed light beam directed to an output apparatus.
Figure 2:
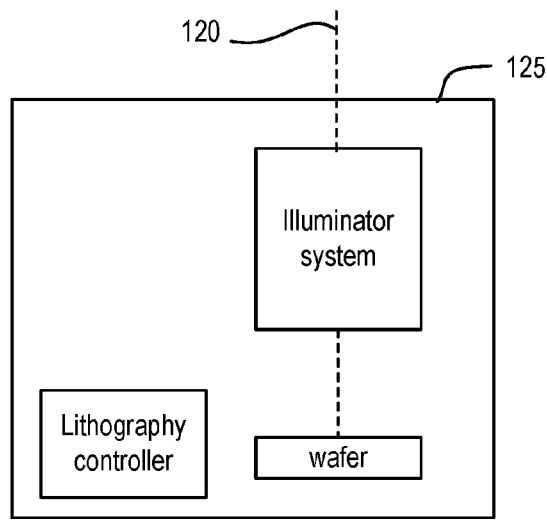
FIG. 2 is a block diagram of an exemplary output apparatus.

Referring to FIG. 1, a gas discharge light source 100 includes a gas discharge system 105 and a gas maintenance system 110. The light source 100 is configured as a part of an optical system 115 that supplies a pulsed light beam 120 that is directed to an output apparatus 125 (such as a photolithography exposure apparatus that patterns microelectronic features on a wafer, as shown in FIG. 2). The pulsed light beam 120 can be directed through a beam preparation system 130 placed between the gas discharge light source 100 and the output apparatus 125.

The gas discharge system 105 includes one or more gas discharge chambers 135. Each gas discharge chamber 135 houses an energy source 140 and contains a gas mixture 145 that includes a gain medium, among other gases. For example, the gas mixture includes a mixture of a gain medium and a buffer gas. The gain medium is the laser-active entity within the gas mixture, and it can be either a single atom or a molecule or a pseudo-molecule. Thus, a population inversion occurs in the gain medium via stimulated emission by pumping the gas mixture (and therefore the gain medium) with an electric discharge from the energy source 140. The gain medium typically includes a noble gas and a halogen, while the buffer gas typically includes an inert gas. The noble gas includes, for example, argon, krypton, or xenon; the halogen includes, for example, fluorine; and the inert gas includes, for example, helium or neon.

The gas maintenance system 110 includes a gas supply system 150; a monitoring system 155; and a control system 160. The gas supply system 150 includes one or more gas control valves as well as one or more gas sources.

The control system 160 is coupled to the gas supply system 150 and to the monitoring system 155. The control system 160 is coupled to a device (such as the gas supply system 150 or the monitoring system 155) external to the control system 160 if the control system 160 is connected (either wired or wirelessly) so that information can be freely passed between the control system 160 and that particular device. The control system 160 can additionally be coupled to one or more of: other devices of the gas discharge light source 100, devices of the beam preparation system 130, and/or devices within the output apparatus 125. For example, the control system 160 can include sub-systems that monitor and control other aspects of the gas discharge light source 100, such as, for example, monitoring a spectral feature of the pulsed light beam 120 or controlling a spectral feature of the pulsed light beam 120.

Additionally, although the control system 160 is represented as a box in which all of the components appear to be co-located, it is possible for the control system 160 to be made up of components that are physically remote from each other.

The control system 160 is configured to provide a signal to activate each energy source 140 of each gas discharge chamber 135. The gas discharge chamber 135 can therefore produce a pulsed amplified light beam (such as the pulsed light beam 120 or an intermediate light beam) if the gas discharge chamber 135 includes additional optical feedback.

The control system 160 receives information from the monitoring system 155 and determines one or more properties of the gas discharge system 105 based on this received information. The control system 160 selects a gas maintenance scheme from among a plurality of possible schemes based on the determined one or more properties of the gas discharge system 105. The control system 160 provides a signal to the gas supply system 150 to cause the gas supply system 150 to apply the selected gas maintenance scheme to the gas discharge system 105. For example, the gas supply system 150 could actuate or control aspects of one or more valves for adjusting a relative amount of gas that is provided from the gas sources.

A gas maintenance scheme includes one or more parameters related to adding one or more supplemental gas mixtures to the gas discharge chambers 135 of the gas discharge system 105.

The gas maintenance system 110 is a gas management system for the gas discharge system 105, and specifically for the gas discharge chambers 135. The gas maintenance system 110 is configured to reduce the consumption or use of at least one component gas (such as a buffer gas, which can be an inert gas such as neon) of the gas mixture used in the gas discharge chambers 135 in order to conserve the component gas while maintaining adequate performance of the gas discharge system 105. The gas maintenance system 110 uses information about the gas discharge system (such as, for example, an age of a gas discharge chamber 135) to determine an appropriate gas maintenance scheme. For example, the control system 160 may determine that the gas discharge system 105 is a young system, which tend to require and consume a high amount of gas mixture. In this case, the control system 160 can select a standard gas maintenance scheme that does not conserve any of the component gases. As another example, the control system 160 may determine that the gas discharge system is a middle-aged system, which tend to require and consume a relatively lower amount of gas mixture. In this case, the control system 160 can select a conservation gas maintenance scheme that conserves as much of the component gas as possible while still maintaining suitable output parameters for the pulsed light beam 120. As yet another example, the control system 160 may determine that the gas discharge system is an older system, which tend to require and consume an amount of gas mixture that is less than the amount required by the young system yet greater than the amount required by the middle-aged system. In this case, the control system 160 can select a mid-level conservation gas maintenance scheme that conserves some of the component gas while still maintaining suitable output parameters for the pulsed light beam 120.

By tailoring the gas maintenance scheme to the age of the gas discharge chamber 135, the customer can obtain conservation of component gas while reducing an amount of downtime of the gas discharge light source 100. At the same time, the performance of the gas discharge light source 100 can be maintained at acceptable levels, even though the gas maintenance scheme may be designed to tolerate a greater depletion of gain medium, which can otherwise reduce an amount of energy and power in the pulsed light beam 120 provided to the output apparatus 125. Downtime of the gas discharge light source 100 is the time during which no pulsed light beam 120 is being provided to the output apparatus 125.

In other implementations, the control system 160 receives one or more operating characteristics of the gas discharge light source 105 from the monitoring system 155. The control system 160 determines whether any of the one or more monitored operating characteristics will be out of an acceptable range at a future time. If the control system 160 determines that any of the one or more monitored operating characteristics will be out of an acceptable range at a future time, then the control system 160 selects a restore gas maintenance scheme. The control system 160 then sends a signal to the gas supply system 150 to apply the selected restore gas maintenance scheme to the gas discharge system 105 by increasing a relative amount a component gas in the gas mixture 145 of at least one of the gas discharge chambers 135.

The restore gas maintenance scheme can be used as a fault tolerance system for when the gas maintenance system 110 is operating in a conservation gas maintenance scheme. For example, the control system 160 can receive from the monitoring system 155 a prediction of a pulsed energy that will be required to be supplied to the gas mixture 145 of a gas discharge chamber 135 at a future time. As another example, the control system 160 can receive from the monitoring system 155 a prediction of an energy of a pulsed light beam output from the gas discharge chamber 135 at a future time. If either of these predictions is outside of a range of acceptable values, then it could be because there is not enough component gas in the gas mixture 145 (due to the implementation of the conservation gas maintenance scheme). Thus, if either or both of these predictions are outside of their range of acceptable values, then the control system 160 can halt the conservation gas maintenance scheme by switching to the restore gas maintenance scheme, which is a scheme that increases an amount of the component gas within the gas mixture 145. Moreover, the determination regarding whether either or both of these predictions are outside their range of acceptable values is an automatic determination (in that it does not require a manual or human intervention). By providing this additional fault tolerance system, it is possible to be more aggressive in selecting when to run a conservation gas maintenance scheme.

Figure 3:
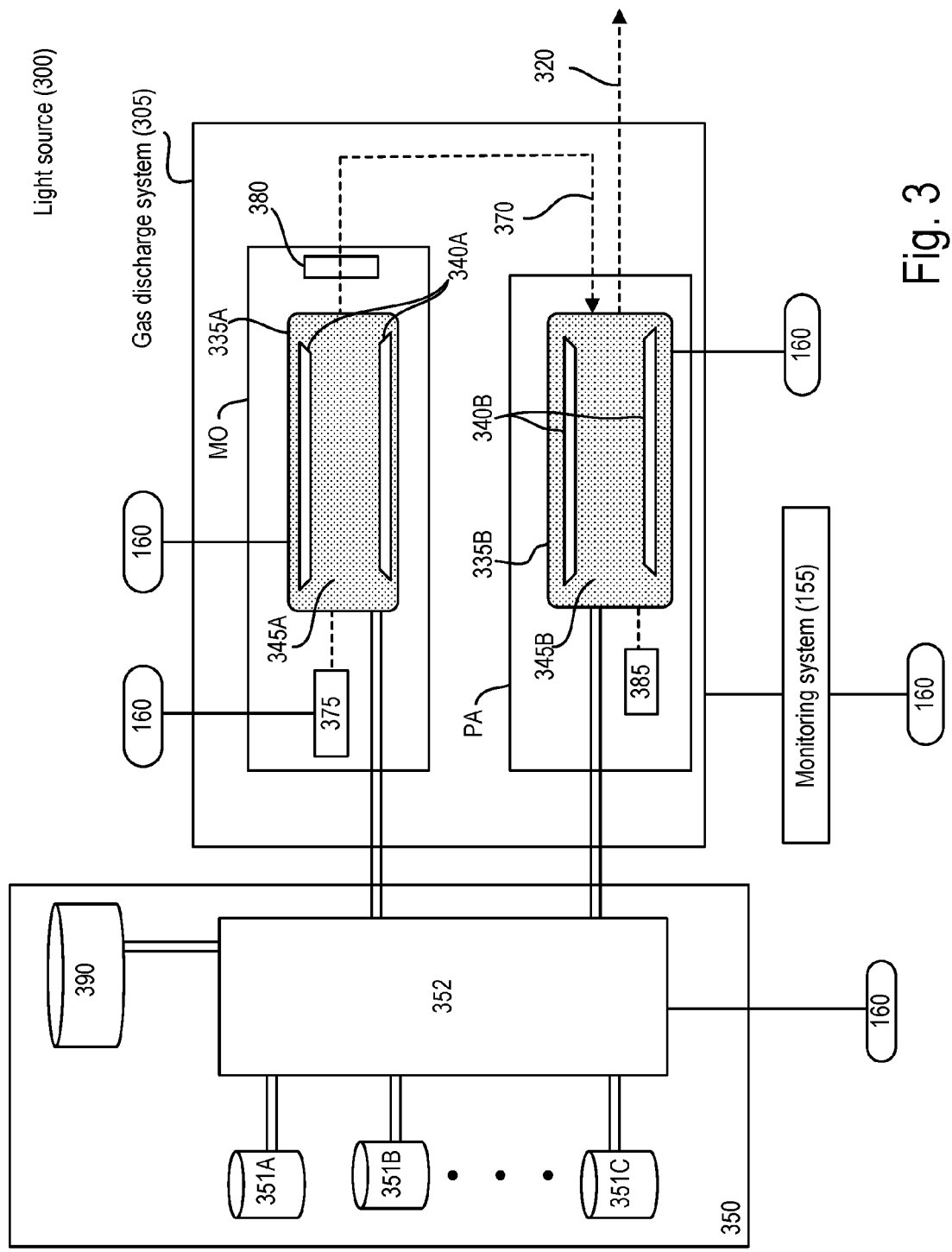
FIG. 3 is a block diagram of an exemplary gas discharge light source.

Details about an exemplary gas discharge light source 300 are provided with reference to FIG. 3. Details about the conservation gas maintenance scheme are provided with reference to FIG. 5, and a description of the fault tolerance system procedure is also found in FIG. 5.

Referring to FIG. 3, an exemplary gas discharge light source 300 includes a gas discharge system 305 that is a dual-chamber pulsed output design and a gas supply system 350.

The gas discharge system 305 includes a master oscillator (MO) having a MO gas discharge chamber 335A and a power amplifier (PA) having a PA gas discharge chamber 335B. The MO gas discharge chamber 335A includes two elongated electrodes 340A that provide a source of pulsed energy to the gas mixture within the MO gas discharge chamber 335A. The PA gas discharge chamber 335B includes two elongated electrodes 340B that provide a source of pulsed energy to the gas mixture within the PA gas discharge chamber 335B.

The master oscillator (MO) provides a pulsed amplified light beam (called a seed light beam) 370 to the power amplifier (PA). The MO gas discharge chamber 335A houses the gas mixture that includes a gain medium in which amplification occurs and the MO includes an optical feedback mechanism such as an optical resonator. The PA gas discharge chamber 335B houses the gas mixture that includes a gain medium in which amplification occurs when seeded with the seed laser beam 370 from the MO. If the PA is designed as a regenerative ring resonator then it is described as a power ring amplifier (PRA), and in this case, enough optical feedback can be provided from the ring design. The MO enables fine tuning of spectral parameters such as the center wavelength and the bandwidth at relatively low output pulse energies (when compared with the output of the PA). The PA receives the output (the seed light beam 370) from the MO and amplifies this output to attain the necessary powers for output to use in the output apparatus 125 (for example, for photolithography).

The MO gas discharge chamber 335A also includes a fan for circulating the gas between the electrodes 340A. A laser resonator is formed between a spectral feature selection system 375 on one side of the MO gas discharge chamber 335A and an output coupler 380 on a second side of the MO gas discharge chamber 335A.

The gas mixture (for example, 145, 345A, 345B) used in the discharge chamber can be a combination of suitable gases for producing an amplified light beam around the required wavelengths and bandwidth. For example, the gas mixture can include argon fluoride (ArF), which emits light at a wavelength of about 193 nm, or krypton fluoride (KrF), which emits light at a wavelength of about 248 nm.

The PA can also include a beam return (such as a reflector) 385 that returns (via reflection, for example) the light beam back into the PA gas discharge chamber 335B to form a circulating and looped path (in which the input into the ring amplifier intersects the output out of the ring amplifier). The PA gas discharge chamber 335B includes a fan for circulating the gas mixture 345B between the electrodes 340B. The seed light beam 370 is amplified by repeatedly passing through the PA. Spectral features of the seed light beam 370 are determined by the configuration of the MO, and these spectral features can be adjusted by adjusting a light beam that is produced within the MO.

The gas supply system 350 includes one or more gas sources 351A, 351B, 351C (such as sealed gas bottles or canisters) and a valve system 352. As discussed above, each of the gas discharge chambers 335A, 335B contains a mixture of gases (a gas mixture 145). As an example, the gas mixture 145 can contain a halogen, for example, fluorine, along with other gases such as argon, neon, and possibly others in different partial pressures that add up to a total pressure P. Thus, the one or more gas sources 351A, 351B, 351C, etc. are connected to the MO gas discharge chamber 335A and the PA gas discharge chamber 335B through a set of valves within the valve system 352. In this way, gas can be injected into the gas discharge chamber 335A, 335B with specific relative amounts of components of the gas mixture. For example, if the gain medium used in the gas discharge chambers 335A, 335B is argon fluoride (ArF), then one of the gas sources 351A can contain a mixture of gases including the halogen fluorine, the noble gas argon, and one or more other rare gases such as buffer gases (inert gas such as neon). This sort of mixture can be referred to as a tri-mix. In this example, another of the gas sources 351B can contain a mixture of gases including argon and one or more other gases but none of the fluorine. This sort of mixture can be referred to as a bi-mix.

The control system 160 can send one or more signals to the valve system 352 to cause the valve system 352 to transfer gases from specific gas sources 351A, 351B, 351C into the gas discharge chambers 335A, 335B in a refill or an inject scheme. Alternatively, or additionally, the control system 160 can send one or more signals to the valve system 352 to cause the valve system 352 to bleed gas from the gas discharge chambers 335A, 335B when necessary, and such bled gas can be vented to a gas dump represented as 390.

During operation of a gas discharge light source 300, the fluorine of the argon fluoride molecule (which provides the gain medium for light amplification) within the gas discharge chambers 335A, 335B is consumed and over time this reduces the amount of light amplification (and therefore the energy of the amplified light beam 370, 320) produced by the respective gas discharge chamber 335A, 335B. Moreover, during operation of the gas discharge light source 300, contaminants can enter the gas discharge chambers 335A, 335B. Accordingly, it is necessary to either inject gases from one or more of the gas sources 351A, 351B, 351C, etc. into the gas discharge chambers 335A, 335B in order to flush contaminants out of the gas discharge chambers 335A, 335B. For example, it is possible to flush the gas discharge chambers using the bi-mix from the gas source 351B. However, each flush uses non-negligible amounts of gas components (such as the buffer gas, which can be an inert gas such as neon) within the bi-mix. Accordingly, the gas maintenance procedure and system described herein strives to reduce one or more of the frequency and size of the bi-mix injections. Because of this reduction in the frequency and/or size of the bi-mix injections, the gas discharge chambers 335A, 335B would need to sustain a lack of injections of the halogen (such as fluorine) for longer periods of time and thus would operate with higher amounts of contaminants. However, the gas discharge light source may suffer greatly in efficiency and power output depending on the age of the gas discharge chamber 335A, 335B if the gas maintenance procedure and system did not take into account the age of the gas discharge chamber 335A, 335B when selecting or choosing a frequency, timing, or size of a gas injection (a gas maintenance scheme). Thus, the gas maintenance procedure and system described herein selective chooses one or more of the frequency and size of a gas injection based on one or more properties (such as age) of the gas discharge system 105, 305. Thus, the gas maintenance procedure and system described herein enables different levels of a reduction in use of a gas component that is used in the gas mixture 145 as a function of the age of the gas discharge chamber 135, 335A, 335B.

Additionally, the gas maintenance procedure and system described herein also includes a safety net sub-process (the restore maintenance scheme described herein) that monitors the operating characteristics of the gas discharge light source 105, 305 to determine whether a lack of gas injection would cause an unacceptable event (such as an unacceptable rise in energy required to be input to the gas mixture 145 to obtain a specific output energy in the pulsed light beam 320, 370 or an unacceptable drop in the output energy of the pulsed light beam 320, 370) at a future time. These gas maintenance and restore schemes can be performed automatically, that is, without the assistance from a person such as a field service engineer. The restore maintenance scheme can be used to restore the gas injection frequency or size to original levels or to request a refill (which is described herein).

A plurality of gas sources 351A, 351B, 351C, etc. are needed because the fluorine in the gas source 351A is at a particular partial pressure that is typically higher than that desired for laser operation. In order to add the fluorine to the MO gas discharge chamber 335A or the PA gas discharge chamber 335B at a desired lower partial pressure, the gas in the gas source 351A can be diluted, and the non-halogen containing gas in the gas source 351B can be used for this purpose.

Although not shown, the valves of the valve system 352 can include a plurality of valves assigned to each of the gas discharge chambers 335A, 335B; for example, an injection valve that allows gas to pass into and out of each gas discharge chamber 335A, 335B at a first rate, and a chamber fill valve that allows gas to pass into and out of each gas discharge chamber 335A, 335B at a second rate that is distinct from (for example, faster) the first rate.

When a refill scheme is performed on the gas discharge chambers 335A, 335B, all of the gas in each of the gas discharge chambers 335A, 335B is replaced by, for example, emptying the gas discharge chamber 335A, 335B (by bleeding the gas mixture out to the gas dump 390) and then refilling that gas discharge chamber 335A, 335B with a fresh gas mixture. The refill is performed with the goal of obtaining a specific pressure and concentration of fluorine in each gas discharge chamber 335A, 335B.

When an injection scheme is performed on the gas discharge chambers 335A, 335B, the gas discharge chambers 335A, 335B are not emptied or are only bled a small amount before a gas mixture is injected into the gas discharge chambers 335A, 335B.

Refill schemes and injection schemes are considered to be gas maintenance schemes applied to the gas discharge system (105 or 305).

Figure 5:
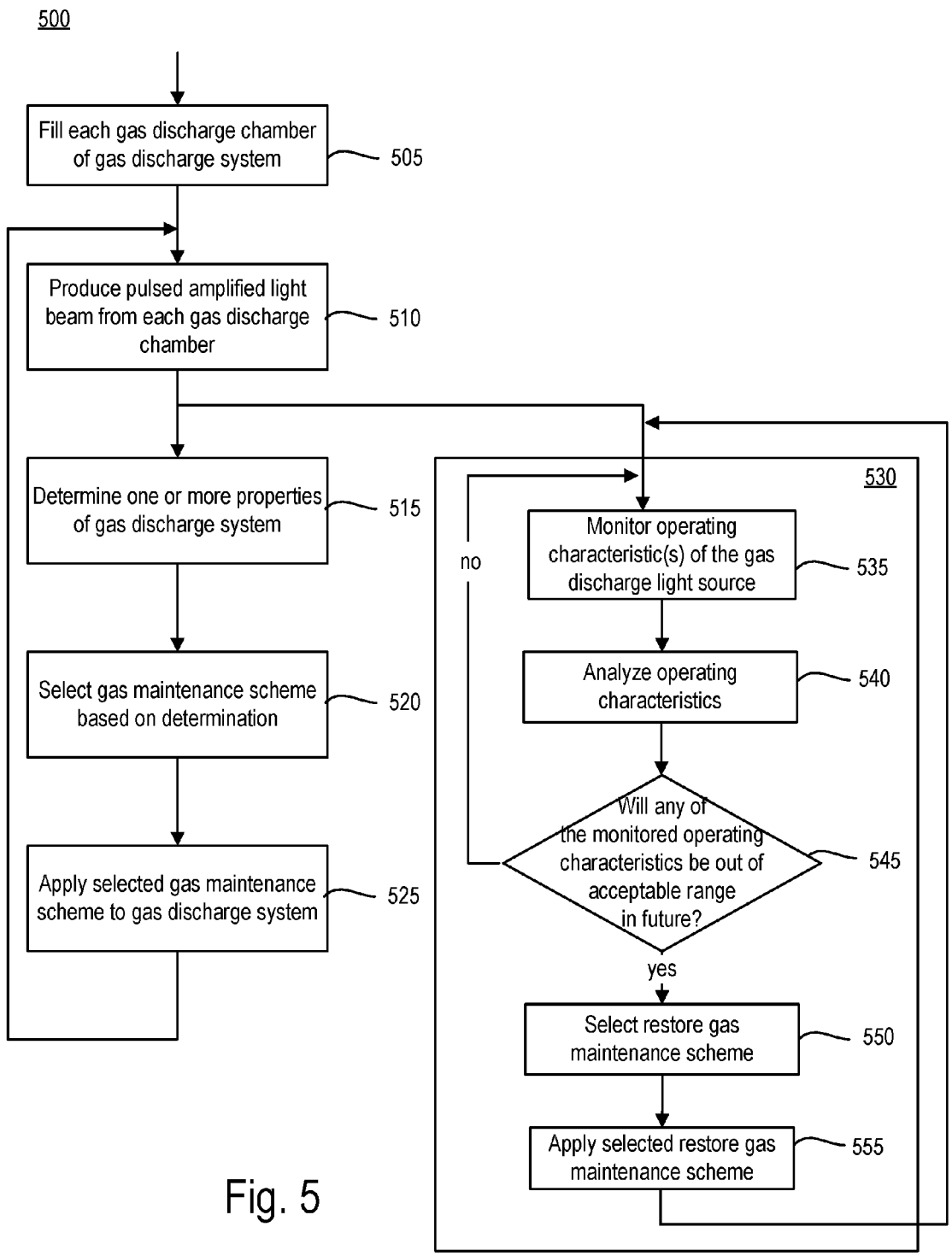
FIG. 5 is a flow chart of a procedure performed by the gas discharge light source of FIGS. 1 and 2 for a gas maintenance scheme, which can also include a sub-procedure for a restore gas maintenance scheme.

Referring to FIG. 5, a procedure 500 is performed by the gas discharge light source 100, 300 for managing an amount of a gas component (such as a buffer gas which can be an inert gas such as neon) within the gas mixture 145. The procedure 500 can be performed while energy is supplied to the gas mixture 145 via the energy source 140 and the amplified light beam 120 is being provided to the output apparatus 125. Alternatively, the procedure 500 can be performed while energy is not being supplied to the gas mixture 145 via the energy source 140 and therefore the amplified light beam 120 is not produced.

The procedure 500 includes filling each of the gas discharge chambers 135, 335A, 335B in the gas discharge system 105, 305 with a respective gas mixture 145, 345A, 345B (505). For each gas discharge chamber 135, 335A, 335B, a pulsed energy is supplied to the respective gas mixture 145 by activating its energy source 140 to thereby produce a pulsed amplified light beam 120, 370, 320 from the gas discharge chamber 135, 335A, 335B (510).

The control system receives information from the monitoring system 155 and determines one or more properties of the gas discharge system 105, 305 (515). The one or more properties of the gas discharge system 105, 305 can include, for example, the age of the gas discharge chamber 135, 335, 335B. The age of the gas discharge chamber 135, 335A, 335B can be determined by probing a shot count associated with that particular chamber 135, 335A, 335B. This shot count is reset manually to a new (for example, zero) value, in the control system 160, when a new chamber is installed. The shot count is a number that corresponds to an integer multiple of the number of pulses of energy supplied to the gas mixture 145 in the gas discharge chamber 135, 335A, 335B.

The control system 160 selects a gas maintenance scheme from among a plurality of possible gas maintenance schemes based on the determined one or more properties of the gas discharge system (520). The selected gas maintenance scheme is then applied to the gas discharge system 105, 305 (525). For example, the control system 160 sends a signal to the gas supply system 150, 350 to open or close one or more of the valves in the valve system 352 to thereby control relative amounts of components of the gas mixture 145.

Each gas maintenance scheme includes one or more parameters related to adding one or more supplemental gas mixtures to the gas discharge chambers 135, 335A, 335B of the gas discharge system 105, 305.

As discussed above, the gas discharge chamber 135 is filled with the gas mixture (505) by filling the gas discharge chamber 135 with a mixture of a gain medium and a buffer gas that make up the gas mixture. The gain medium can include a noble gas such as argon, krypton, or xenon, and a halogen such as fluorine, and the buffer gas can include an inert gas such as helium or neon.

The pulsed energy can be supplied to the respective gas mixture 145 (510) by activating its energy source 140, 340A, 340B by applying a pulsed voltage to the pair of electrodes within the gas discharge chamber 135, 335A, 335B so that an electrical stimulation is applied to the halogen (for example, fluorine) within the gas mixture 145.

One of the properties of the gas discharge system that is determined is an age of at least one of the gas discharge chambers 135, 335A, 335B of the gas discharge system 105, 305. The age can be determined based on one or more of: how many times that gas discharge chamber has been filled with the gas mixture and how often the energy source of that gas discharge chamber has been activated.

The control system 160 may determine that an age of at least one of the gas discharge chambers 135, 335A, 335B is in a first range. In this case, the control system 160 selects a standard gas injection scheme, and sends a signal to the gas supply system 150, 350 to apply the selected gas injection scheme to the gas discharge system 105, 305 by pumping at least a first amount of a buffer gas (for example, neon) into the gas mixture 145 of the gas discharge chamber 135, 335A, 335B. The first range could represent an age of a gas discharge chamber 135, 335A, 335B that is early in life, which means that the gas discharge chamber 135, 335A, 335B has been in operation for a very little amount of time when compared to its total life span. The first amount of buffer gas can be the standard amount (which is based on frequency and size of gas injection from the gas supply system 150, 350) that would be applied without attempting to conserve any of the gas components of the gas mixture.

The control system 160 may determine that an age of at least one of the gas discharge chambers 135, 335A, 335B is in a second range. In this case, the control system 160 selects a conservation gas injection scheme, and sends a signal to the gas supply system 150, 350 to apply the conservation gas injection scheme to the gas discharge system 135, 335A, 335B by pumping a second amount of the buffer gas (for example, neon) into the gas mixture 145 of the gas discharge chamber 135, 335A, 335B. The second amount of buffer gas is lower than the first and standard amount, which means that either or both of a frequency and size of gas injection is reduced in the conservation gas injection scheme. The second range represents an age of the gas discharge chamber 135, 335A, 335B that is mid-life; which means that the gas discharge chamber 135, 335A, 335B has been in operation for an amount of time that is near to a mid-way point of its total life span.

The control system 160 may determine that an age of at least one of the gas discharge chambers 135, 335A, 335B is in a third range. In this case, the control system 160 selects another conservation gas injection scheme (which may be distinct from the conservation gas injection scheme discussed above), and the control system 160 sends a signal to the gas supply system 150, 350 to apply the other conservation gas injection scheme to the gas discharge system 135, 335A, 335B by pumping a third amount of the buffer gas (for example, neon) into the gas mixture 145 of the gas discharge chamber 135, 335A, 335B. The third amount of buffer gas is lower than the first (and standard) amount but is greater than the second amount. This means that either or both of a frequency and size of gas injection is reduced in the other conservation gas injection scheme when compared with the standard gas injection scheme but is still greater than the frequency and/or size of gas injection used in the conservation gas injection scheme discussed above. The third range represents an age of the gas discharge chamber 135, 335A, 335B that is late in life, which means that the gas discharge chamber 135, 335A, 335B has been in operation for an amount of time that is past the mid-way point of its total life span.

The first range of ages can be a value less than or equal to a lower value, the second range of ages can be a value that is greater than the lower value, and the third range of ages can be a value that is greater than an upper value. For example, the first range can be 0-1 billion pulses of the energy source 140, the second range can be 1-25 billion pulses of the energy source 140, and the third range can be greater than 25 (for example, 25-30) billion pulses of the energy source 140. In this example, a young gas discharge system 105 would therefore be a system 105 that has only operated for 1 billion or fewer pulses, a mid-age gas discharge system 105 would be a system 105 that has operated for 1-25 billion pulses, and an old gas discharge system 105 would be a system 105 that has operated for greater than 25 billion pulses.

The first range can be a first value of the age and the second range can be a second value of the age. The third range can be a third value of the age.

The second range can be distinct from the first range.

In other implementations, alternatively or additionally, the standard gas injection scheme includes pumping or performing an injection of the buffer gas into the gas mixture of the gas discharge chamber at a first temporal frequency; the conservation gas injection scheme includes pumping or performing an injection of the buffer gas into the gas mixture of the gas discharge chamber at a second temporal frequency that is different from the first temporal frequency. The second temporal frequency is less than the first temporal frequency.

In some implementations, the temporal frequency is measured in pulses or shots. For example, the standard gas injection scheme could include performing an injection of the buffer gas into the gas mixture of the gas discharge chamber each time a certain number of pulses are supplied to the energy source 140. For example, for every one million pulses of the pulsed light beam 120 that have been produced (or after one million pulses of energy are supplied to the energy source 140), an injection is performed under the standard gas injection scheme. As another example, in the conservation gas injection scheme, an injection of the buffer gas into the gas mixture occurs with every two million pulses of the pulsed light beam 120 that have been produced. In this example, the injection of the buffer gas could happen between pulses.

In other implementations, the temporal frequency is measured in time without taking into account the number of pulses or shots. For example, the standard gas injection scheme could include performing an injection of the buffer gas into the gas mixture every X minutes while the conservation gas injection scheme could include performing an injection of the buffer gas into the gas mixture every Y minutes, where Y is less than X. In this example, the injection of the buffer gas could happen after the energy is stop being supplied to the energy source 140.

As discussed above, the buffer gas is injected into the gas mixture of the gas discharge chamber; however, because the buffer gas is mixed with other gas components as discussed above, this also includes injecting one or more components of the gain medium into the gas mixture of the at least one gas discharge chamber.

The control system 160 can also receive information from the monitoring system 155 that provides one or more operating characteristics of the gas discharge light source 105, 305. The control system 160 determines whether any of the one or more monitored operating characteristics is out of an acceptable range. And, if the control system 160 determines that any of the one or more monitored operating characteristics is out of an acceptable range, then the control system 160 selects the restore gas maintenance scheme and sends a signal to the gas supply system 150, 350 to apply the selected restore gas maintenance scheme to the gas discharge system 105, 305.

The gas supply system 150, 350 applies the selected restore gas maintenance scheme to the gas discharge system 105, 305 by applying one or more of a restore injection scheme and a refill scheme to the gas discharge system 105, 305.

In the restore injection scheme, the gas supply system 150, 350 performs an injection of a buffer gas into the gas mixture 145 of at least one of the gas discharge chambers 135, 335A, 335B that increases a relative amount of the buffer gas in the gas mixture 145 of the gas discharge chamber 135, 335A, 335B. For example, in the restore injection scheme, the gas supply system 150, 350 can alter a temporal frequency at which the gas injection is performed or can pump a different amount of buffer gas into the gas mixture 145 than was pumped before it was determined that any of the one or more monitored operating characteristics is out of an acceptable range.

The gas supply system 150, 350 can alter the temporal frequency at which the gas injection is performed by increasing a frequency at which the gas injection is performed.

The gas supply system 150, 350 can pump the different amount of buffer gas into the gas mixture 145 than was pumped before it was determined that any of the one or more monitored operating characteristics is out of an acceptable range by pumping less buffer gas into the gas mixture 145 than was pumped before it was determined that any of the one or more monitored operating characteristics is out of an acceptable range.

The gas supply system 150, 350 applies the selected gas maintenance scheme to the gas discharge system 105, 305 after each of the gas discharge chambers 135, 335A, 335B is filled with its respective gas mixture 145. Moreover, the control system 160 may instruct the gas supply system 150, 350 to perform a refill scheme on the gas discharge chamber 135, 335A, 335B after the gas supply system 150, 350 has applied the selected gas maintenance scheme to the gas discharge system 105, 305. The refill scheme includes emptying each of the gas discharge chambers 135, 335A, 335B of the gas discharge system 105, 305; and refilling each gas discharge chamber 135, 335A, 335B with a fresh gas mixture from one or more of the gas sources 351A, 351B, 351C, etc. For example, the gas sources 351A and 351B can be used for refilling, and the valve system 352 can be used to adjust the relative flow rates between the gas mixtures that flow from the respective gas sources 351A, 351B.

Thus, as discussed above, a gas maintenance scheme that is applied to the gas discharge system 105, 305 includes one or more of the following parameters: an amount of a component gas (such as a buffer gas) that is to be pumped into the gas mixture 145; and a temporal frequency at which an injection of the component gas (such as the buffer gas) into the gas mixture 145 is performed.

Additionally, at least one of the gas maintenance schemes could be a refill scheme that includes emptying at least one of the gas discharge chambers 135, 335A, 335B and refilling that emptied gas discharge chamber 135, 335A, 335B with fresh gas mixture 145.

As discussed above, in addition to the gas maintenance scheme described above, it is possible to perform a restore maintenance scheme in order to ensure that the gas discharge light source 100, 300 continues to operate at levels that are acceptable to the output apparatus 125.

Referring again to FIG. 5, a restore maintenance sub-procedure 530 is performed, as follows, during operation of or following the gas maintenance scheme 500 and is performed by the gas discharge light source 100, 300. The control system 160 receives one or more operating characteristics of the gas discharge light source 100, 300 that are measured or monitored by the monitoring system 155 (535). The control system 160 analyzes those operating characteristics of the gas discharge light source 100, 300 (540) and, based on this analysis, determines whether any of the one or more monitored operating characteristics will be out of an acceptable range (545) at a future time. If the control system 160 determines that any of the one or more monitored operating characteristics will be out of an acceptable range (545) at a future time, then the control system 160 selects a particular restore gas maintenance scheme (550) from a set of possible restore gas maintenance schemes, and sends a signal to the gas supply system 150, 350 to apply the selected restore gas maintenance scheme to the gas discharge system 105, 305 (555) by increasing a relative amount a component gas (such as the buffer gas of neon) in the gas mixture 145 of at least one of the gas discharge chambers 135, 335A, 335B. The relative amount of the component gas in the gas mixture 145 can be increased by applying a restore gas injection scheme to the at least one gas discharge chamber 135, 335A, 335B.

The restore injection scheme can be applied to the gas discharge chamber 135, 335A, 335B by increasing a temporal frequency at which an injection of the component gas is performed, as discussed above. Alternatively or additionally, the restore injection scheme can be applied to the gas discharge chamber 135, 335A, 335B by pumping more component gas into the gas mixture 145 of the gas discharge chamber 135, 335A, 335B than was pumped before it was determined that any of the one or more monitored operating characteristics will be out of an acceptable range at a future time.

An exemplary operating characteristic of the gas discharge light source 100, 300 that can be monitored is a pulsed energy that is required to be supplied to the gas mixture 145 in at least one of the gas discharge chambers 135, 335A, 335B. Another exemplary operating characteristic of the gas discharge light source 100, 300 that can be monitored is an energy of the pulsed amplified light beam 120, 320, 370 output from at least one of the gas discharge chambers 135, 335A, 335B.

These operating characteristics can be monitored by measuring one or more characteristics of the gas discharge light source 100, 300. Measured characteristics include the pulsed energy supplied to the gas mixture of at least one of the gas discharge chambers; an energy of the pulsed amplified light beam output from at least one of the gas discharge chambers; a change in the pulsed energy supplied to the gas mixture of at least one of the gas discharge chambers over time; and a change in the energy of the pulsed amplified light beam output from at least one of the gas discharge chambers over time. The pulsed energy supplied to the gas mixture 145 is directly correlated to a voltage that is applied to the energy source 140, 340A, 340B in the gas discharge chamber 135, 335A, 335B.

By monitoring the change in an operating characteristic (such as the energy of the pulsed amplified light beam output from at least one of the gas discharge chambers or the pulsed energy to be supplied to the gas mixture in one or more gas discharge chambers) over time, it is possible to see how the operating characteristic is changing over time and to generally look at its instantaneous slope to see if the characteristic is rising rapidly in one direction such that it could be out of an acceptable range at a future time.

The measured characteristics can be averaged values of the measured characteristics, for example, the average value of a measured characteristic over a number (for example, hundreds or thousands) of pulses of the energy supplied to the gas mixture 145. In this way, erroneous or outlier values can be excluded from the calculation to avoid imposing the restore gas maintenance scheme at times when it's not needed.

The values of the measured characteristics can be averaged using an adaptive filter such as a recursive least squares (RLS) filter. Such a filter uses the average values of the measured characteristics to calculate the instantaneous slope and offset value for a linear model predicting the time series and the value of the slope can therefore be used to determine the predictions. For example, if the control system 160 predicts that one or more of the pulsed energy [that will be required to be supplied to the gas mixture 145 in at least one of the gas discharge chambers 135, 335A, 335B] and the energy of the pulsed amplified light beam 120, 320, 370 [output from at least one of the gas discharge chambers 135, 335A, 335B] will cross a pre-determined respective threshold in 10 million pulses (which is the future time), then the control system 160 can determine that the respective monitored operating characteristic will be out of an acceptable range at a future time, and the control system 160 assigns a fault state of 2 to this determination. As another example, if the control system 160 predicts that one or more of the pulsed energy [that will be required to be supplied to the gas mixture 145 in at least one of the gas discharge chambers 135, 335A, 335B] and the energy of the pulsed amplified light beam 120, 320, 370 [output from at least one of the gas discharge chambers 135, 335A, 335B] will cross a predetermined respective threshold in 20 million pulses (which is the future time), then the control system 160 can determine that the respective monitored operating characteristic is at risk for being out of an acceptable range at a future time, and the control system 160 assigns a fault state of 1 to this determination. If the control system 160 assigns the fault state of 1 to a determination, then the control system 160 could select the restore gas maintenance scheme that applies a standard gas injection scheme to the gas discharge system 105, 305 (and thereby restore the gas injection levels to their baseline value, the value before the risk took place). If the control system assigns the fault state of 2 to a determination, then the control system 160 could include a refill scheme in addition to the restore gas maintenance scheme because the risk would be much higher for a fault and a more immediate and aggressive set of actions should be taken.

The adaptive filter may need to be reset when its linear model does not fit well with the prediction, which can happen when there is a change in operating conditions of the gas discharge light source 100, 300. The adaptive filter may also include a forgetting factor, and all variables can be initialized upon refill because the slope may be limited in magnitude and have a finite memory (and therefore cannot change very fast).

The control system 160 can monitor the one or more operating characteristics of the gas discharge light source 100, 300 by calculating values of the operating characteristics. The control system 160 can determine whether any of the one or more monitored operating characteristics will be out of the acceptable range at a future time by determining whether any of the calculated values of the operating characteristics will be out of the acceptable range at a future time. The control system 160 can calculate values of the operating characteristics by calculating average values of the operating characteristics.

The relative amount of the component gas in the gas mixture 145 of the gas discharge chamber 135, 335A, 335B can be increased by applying a refill scheme to the gas discharge chamber 135, 335A, 335B. The refill scheme includes: purging the gas mixture 145 from the gas discharge chamber 135, 335A, 335B, and filling the gas discharge chamber 135, 335A, 335B with a fresh gas mixture that includes the component gas.

The control system 160 can determine whether any of the one or more monitored operating characteristics will be out of the acceptable range at a future time by determining whether any of the one or more monitored operating characteristics is likely to be out of the acceptable range at a future time.

The control system 160 can determine whether any of the one or more monitored operating characteristics will be out of the acceptable range at a future time by, for example, determining a rate of change of each of the one or more monitored operating characteristics; and/or determining whether the rate of change for each of the one or more monitored operating characteristics indicates whether that monitored operating characteristic is likely to be out of the acceptable range at a future time.

The control system 160 can also determine whether any of the one or more monitored operating characteristics will be out of another acceptable range at a future time. Moreover, if the control system 160 determines that any of the one or more monitored operating characteristics will be out of the other acceptable range at a future time, then the control system 160 can send a signal to the gas supply system 150, 350 to apply a refill scheme to at least one gas discharge chamber 135, 335A, 335B. The refill scheme includes purging the gas mixture 145 from the gas discharge chamber 135, 335A, 335B, and filling the purged gas discharge chamber with fresh gas mixture 145 that includes the component gas.

Figure 6:
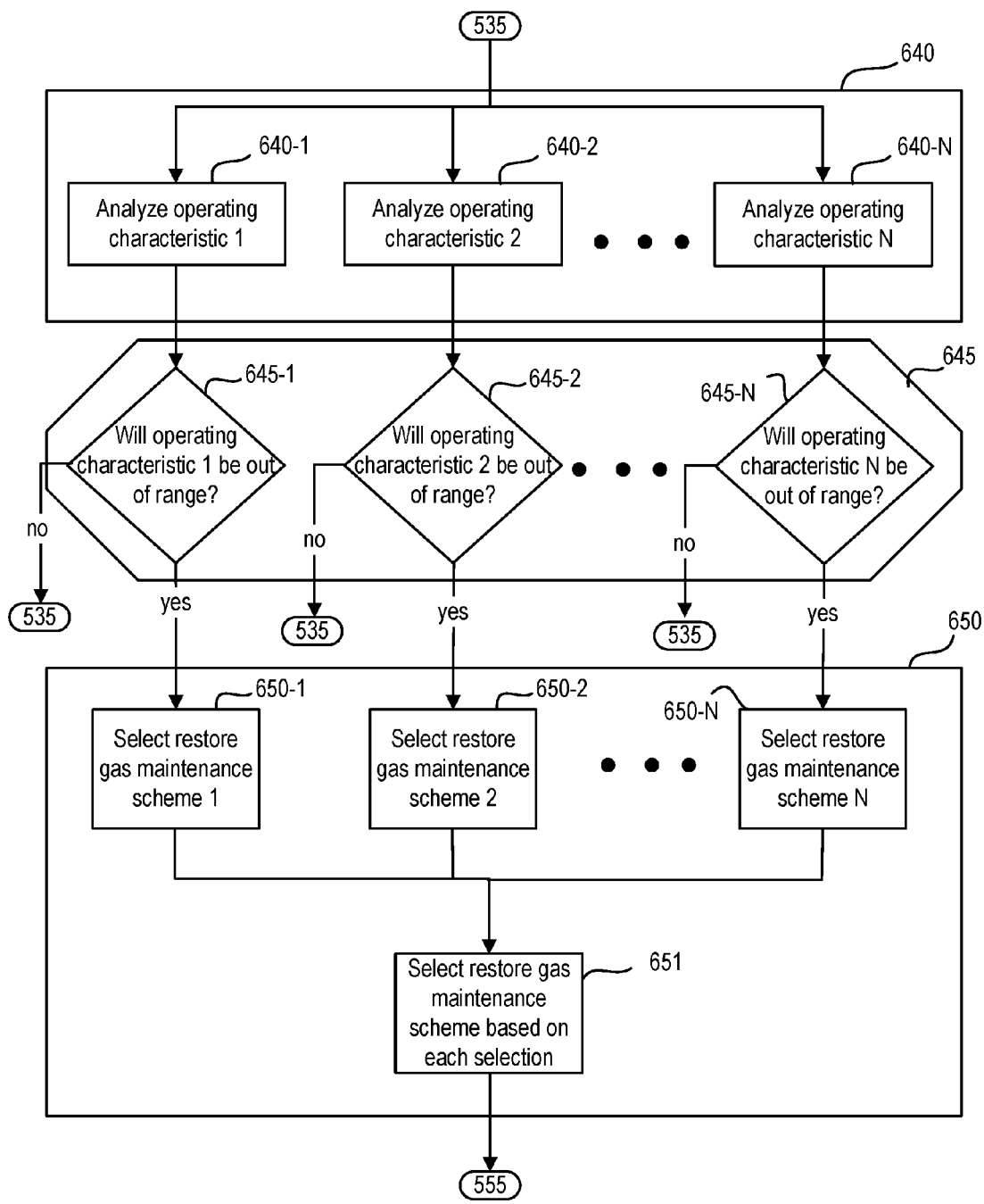
FIG. 6 is a flow chart of exemplary procedures performed by the control system of the light source of FIGS. 1 and 2 for determining whether a monitored operating characteristic will be out of an acceptable range at a future time and selecting a restore gas maintenance scheme.

Referring to FIG. 6, exemplary procedures 640, 645, 650 are performed by the control system 160 for analyzing the operating characteristics (540), based on that analysis, determining whether a monitored operating characteristic will be out of an acceptable range at a future time (545); and selecting a restore gas maintenance scheme (550).

During the procedure 640, the control system performs an analysis (640-1, 640-2, . . . 640-N) for each of the operating characteristics that are being monitored (535). The outputs from those respective analyses (640-1, 640-2, . . . 640-N) are directed to the procedure 645, where respective determinations (645-1, 645-2, . . . 645-N) are performed based on those outputs. If the determination relating to operating characteristic 1 finds that operating characteristic 1 will be out of range at a future time, then the control system 160 selects a restore gas maintenance scheme associated with that determination (650-1). Similarly, if the determination relating to operating characteristic 2 finds that operating characteristic 2 will be out of range at a future time, then the control system 160 selects a restore gas maintenance scheme associated with that determination (650-2). The control system 160 then reviews each of the selected restore gas maintenance schemes 1, 2, . . . N for each operating characteristic and selects a final restore gas maintenance scheme for output. Thus, for example, it is possible that the control system 160 determines that one of the operating characteristics will be outside a range at a first future time and that all remaining operating characteristics will be outside the range at a second future time that is greater than the first future time. In this case, the control system 160 can select a restore gas maintenance scheme for the entire light source 100 that requires a full refill of all of the gas mixtures in all of the chambers of the gas discharge system 105, 305.

Figure 7:
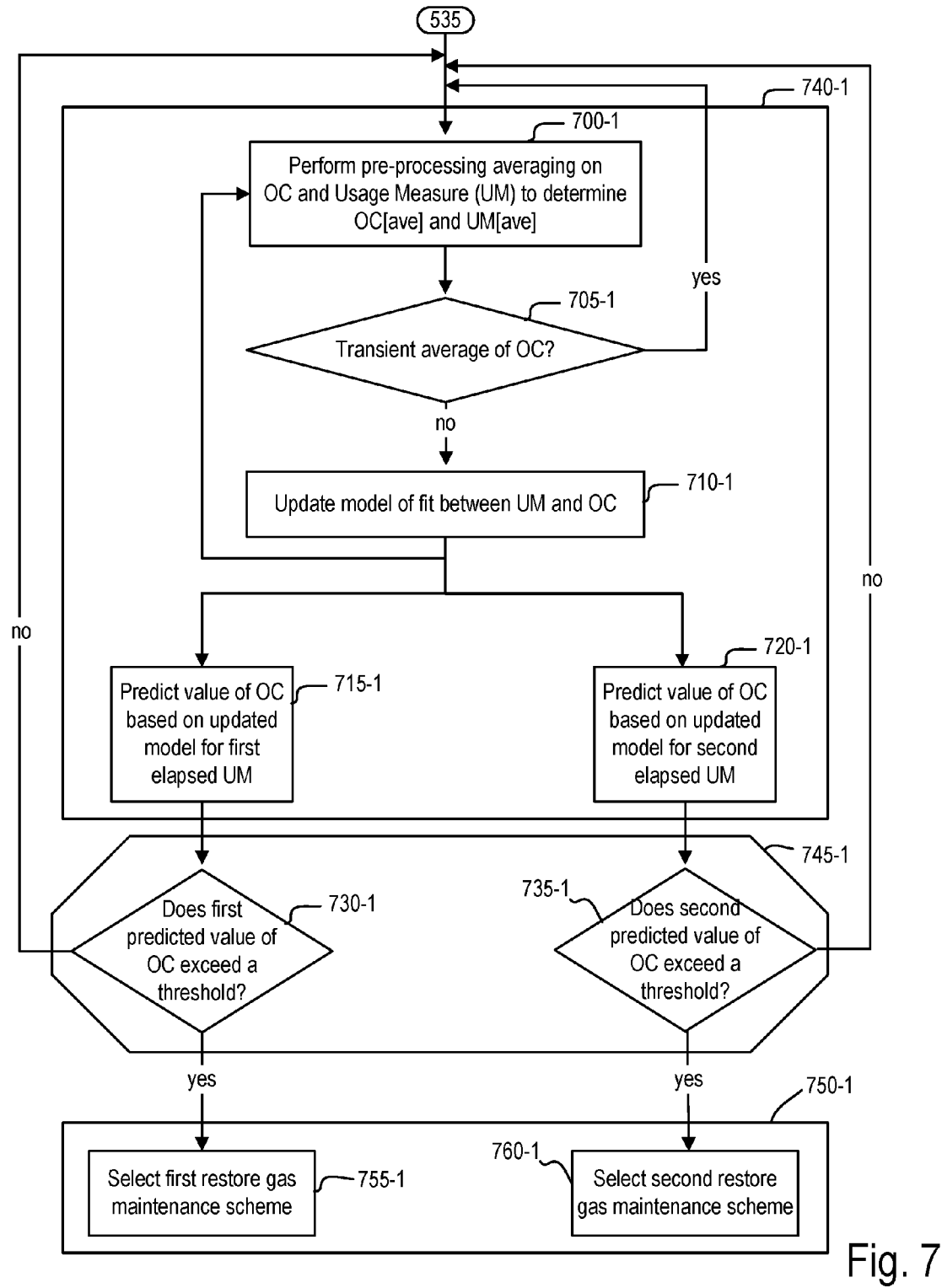
FIG. 7 is a flow chart of exemplary procedures are sequentially performed by the control system of the light source of FIGS. 1 and 2 for determining how the operating characteristic changes with the usage of the light source.

Referring to FIG. 7, exemplary procedures 740-1, 745-1, 750-1 are sequentially performed for the first operating characteristic. These exemplary procedures 740-1, 745-1, 750-1 can be applied to the other operating characteristics.

The procedure 740-1 generally determines how the operating characteristic OC changes with the usage (UM) of the light source 100. The usage of the light source (UM) is measured in any useful unit and can be measured in time (for example, seconds, minutes, hours, etc.) since the light source chamber 135 was last refilled. In other implementations, usage is measured by counting a number of pulses or shots of the pulsed amplified light beam 120 from a point in time at which the light source chamber 135 was last refilled.

Moreover, the procedure 740-1 also generally operates by averaging the values of the operating characteristic OC and usage UM in order to monitor long term trends and discard changes in values that occur on a short timescale.

Initially in the procedure 740-1, the control system 160 performs a pre-processing averaging of the operating characteristic OC over the light source usage UM (that can be measured in average number of shots or pulses) (700-1). Averaging ensures that long term trends are monitored. Next, the control system 160 determines whether the averaged operating characteristic is a value outside of an acceptable range (705-1) in order to cull those values that are transient in nature from the next model calculation.

Assuming that the next value has not been culled (705-1), the control system 160 updates a model of a fit between the usage UM and the operating characteristic OC (710-1) with the averaged values of the operating characteristic OC and the usage UM. It should be noted that following a refill of the gas mixture in the gas discharge chamber 135 of the light source 100, the model can be set to a standard model to start, and then with each new averaged value, the model is updated in a recursive manner (using a recursive least squares process). In some implementations, the model can be a linear fit between the usage UM and the operating characteristic OC. In this case, the control system 160 outputs at 710-1 a value of the local slope (a measure of how the operating characteristic OC changes over a certain usage UM) and the offset in the operating characteristic OC. In other implementations, the model is a non-linear fit between the usage UM and the operating characteristic OC and the control system 160 outputs at 710-1 a set of coefficients of the model.

The control system 160 next predicts a value of the operating characteristic OC for a first elapsed usage UM (715-1) based on the output from the updated model (710-1) and a value of the operating characteristic OC for a second elapsed usage UM (720-1) based on the output from the updated model (710-1). For example, if the model is a linear fit, and the output of the updated model (710-1) is a local slope that represents how the operating characteristic OC changes with usage UM, then the prediction can measure the operating characteristic OC that corresponds to the first elapsed usage UM (715-1) and the operating characteristic OC that corresponds to the second elapsed usage UM (720-1). For example, the value of the operating characteristic OC for the first elapsed usage UM (715-1) can be a value of the operating characteristic OC after another 10 million pulses have elapsed (this value of the operating characteristic OC can be referred to as the fail OC). As another example, the value of the operating characteristic OC for the first elapsed usage UM (715-1) can be a value of the operating characteristic OC after another 20 million pulses have elapsed (this value of the operating characteristic OC can be referred to as the risk OC).

Once these predicted values are calculated at 715-1, 720-1, then a determination is made as to whether each predicted value exceeds a pre-determined threshold or thresholds (730-1, 735-1, respectively).

Figure 8:
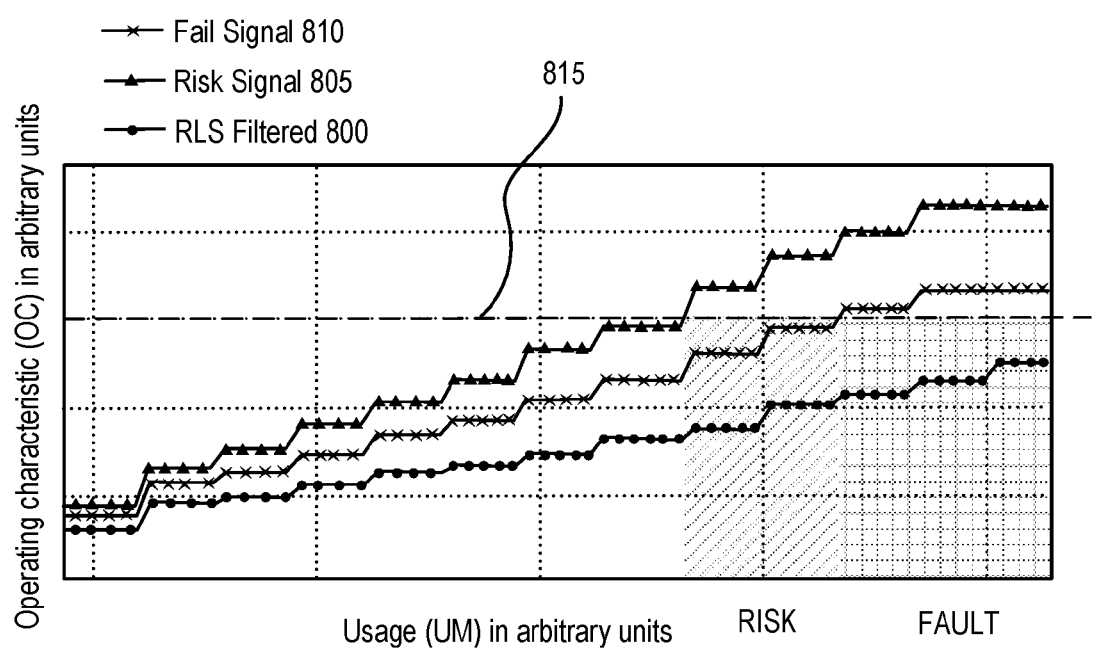
FIG. 8 is a chart of graphs of the various outputs during one of the procedures of FIG. 7.

Referring to FIG. 8, graphs 800, 805, 810 of the various outputs during the procedure 740-1 are shown. Graph 800 shows the value of the local slope (the change in operating characteristic OC versus elapsed usage UM) in the updated model at 710-1 versus the elapsed usage UM. Graph 805 shows the predicted value of the operating characteristic OC after the second elapsed usage UM output at 720-1. Graph 810 shows the predicted value of the operating characteristic OC after the first elapsed usage UM output at 715-1. The upper threshold level 815 is shown because the operating characteristic OC is trending upward in this example. If the risk signal 805 crosses the upper threshold level 815, then the control system 160 deems that there is a risk that a fault will occur and a first warning is issued. If the risk signal 805 crosses the upper threshold level 815 and the fail signal 810 crosses the upper threshold level 815, then the control system 160 deems that there is a fault is imminent and a second warning is issued. The control system 160 selects the appropriate restore gas maintenance scheme depending on the warning that is issued.

As an example, if the operating characteristic OC that is being monitored (535) is the pulsed energy required to be supplied to the gas mixture 145 in a gas discharge chamber, then this can be monitored by monitoring the voltage supplied to the energy source 140. The upper threshold level 815 can be 1150 volts and the lower threshold level (not shown in FIG. 8) can be 870 volts. As another example, if the operating characteristic OC that is being monitored (535) is the output energy of the pulsed amplified light beam output from at least one of the gas discharge chambers, then the output energy of the pulsed amplified light beam can be monitored directly. The upper threshold level 815 can be 4 millijoules (mJ) and the lower threshold level can be 0.2 mJ.

Figure 4:
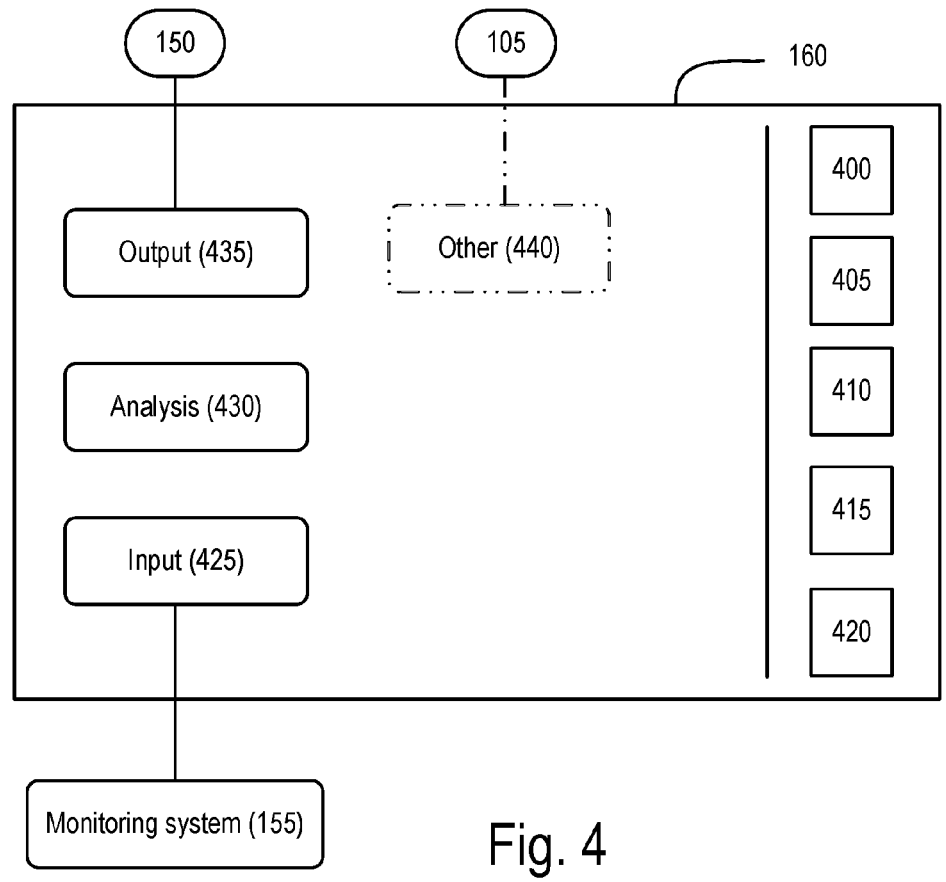
FIG. 4 is a block diagram of an exemplary control system for performing gas maintenance and restore gas maintenance schemes.

Referring to FIG. 4, in general, the control system 160 includes one or more of digital electronic circuitry, computer hardware, firmware, and software. The control system 160 includes memory 400, which can be read-only memory and/or random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. The control system 160 can also include one or more input devices 405 (such as a keyboard, touch screen, microphone, mouse, hand-held input device, etc.) and one or more output devices 410 (such as a speaker or a monitor).

The control system 160 includes one or more programmable processors 415, and one or more computer program products 420 tangibly embodied in a machine-readable storage device for execution by a programmable processor (such as the processors 415). The one or more programmable processors 415 can each execute a program of instructions to perform desired functions by operating on input data and generating appropriate output. Generally, the processor 415 receives instructions and data from memory 400. Any of the foregoing may be supplemented by, or incorporated in, specially designed ASICs (application-specific integrated circuits).

The control system 160 includes, for example, various processing systems such as a system 425 for receiving the data from the monitoring system 155, a system 430 for analyzing this data and deciding what sort of action should occur, and a system 435 for outputting a signal to the gas supply system 150 based on the decision output from the system 430. Each of these processing systems can be a set of computer program products executed by one or more processors such as the processors. The control system 160 can include other processing systems (represented generically as box 440) for performing other tasks not related to gas maintenance.

Other implementations are within the scope of the following claims.

For example, the one or more properties of the gas discharge system 105 that can be determined by the control system 160 can include a property of the pulsed light beam 120 output from the gas discharge system 105. Exemplary properties that can be determined include an energy of the pulsed light beam 120, an optical divergence of the pulsed light beam 120, and a bandwidth of the pulsed light beam 120. As another example, the one or more properties of the gas discharge system 105 that can be determined by the control system 160 can include an efficiency at which the gas discharge system 105 operates, the efficiency can be determined by measuring various aspects of the pulsed light beam 120 as well as the energy that is supplied to the energy source 140.

What is claimed is:

1. A method of operating a gas discharge light source comprising a gas discharge system that includes one or more gas discharge chambers, each gas discharge chamber housing an energy source, the method comprising:
    filling each of the gas discharge chambers in the gas discharge system with a respective gas mixture;
    for each gas discharge chamber, supplying a pulsed energy to the respective gas mixture by activating its energy source to thereby produce a pulsed amplified light beam from the gas discharge chamber;
    determining one or more properties of the gas discharge system;
    selecting a gas maintenance scheme from among a plurality of possible schemes based on the determined one or more properties of the gas discharge system; and
    applying the selected gas maintenance scheme to the gas discharge system;
    wherein a gas maintenance scheme includes one or more parameters related to adding one or more supplemental gas mixtures to the gas discharge chambers of the gas discharge system.

2. The method of claim 1, wherein determining one or more properties of the gas discharge system comprises determining one or more properties of each of the gas discharge chambers in the gas discharge system.

3. The method of claim 1, wherein applying the selected gas maintenance scheme to the gas discharge system comprises applying the selected gas maintenance scheme to each of the gas discharge chambers of the gas discharge system.

4. The method of claim 1, wherein the gas discharge system includes two gas discharge chambers.

5. The method of claim 1, wherein filling a gas discharge chamber with the respective gas mixture comprises filling the gas discharge chamber with a mixture of a gain medium and a buffer gas.

6. The method of claim 5, wherein filling a gas discharge chamber with the mixture of the gain medium and the buffer gas comprises filling the gas discharge chamber with a gain medium that includes a noble gas and a halogen, and a buffer gas that includes an inert gas.

7. The method of claim 6, wherein the noble gas includes argon, krypton, or xenon; the halogen includes fluorine; and the inert gas includes helium or neon.

8. The method of claim 1, wherein supplying the pulsed energy to a respective gas mixture by activating its energy source comprises applying a pulsed voltage to a pair of electrodes within the gas discharge chamber so that an electrical stimulation is applied to a halogen within the gas mixture.

9. The method of claim 1, wherein determining one or more properties of the gas discharge system comprises determining an age of at least one of the gas discharge chambers of the gas discharge system based on one or more of: how many times that gas discharge chamber has been filled with the gas mixture and how often the energy source of that gas discharge chamber has been activated.

10. The method of claim 1, wherein determining the one or more properties of the gas discharge system, selecting the gas maintenance scheme, and applying the selected gas maintenance scheme to the gas discharge system occur while pulsed energy is being supplied to the gas mixture of the one or more gas discharge chambers.

11. The method of claim 1, wherein determining the one or more properties of the gas discharge system, selecting the gas maintenance scheme, and applying the selected gas maintenance scheme to the gas discharge system occur while pulsed energy is not being supplied to the gas mixture of any of the gas discharge chambers.

12. The method of claim 1, wherein:
selecting the gas maintenance scheme from among the plurality of possible gas maintenance schemes comprises selecting a standard gas injection scheme if it is determined that an age of at least one of the gas discharge chambers is in a first range, and applying the selected gas injection scheme to the gas discharge system comprises pumping at least a first amount of a buffer gas into the gas mixture of the at least one gas discharge chamber; and
selecting the gas maintenance scheme from among the plurality of possible gas maintenance schemes comprises selecting a conservation gas injection scheme if it is determined that an age of the at least one gas discharge chamber is in a second range, and applying the selected conservation gas injection scheme to the gas discharge system comprises pumping a second amount of the buffer gas into the gas mixture of the at least one gas discharge chamber, the second amount being lower than the first amount.

13. The method of claim 12, wherein selecting the gas maintenance scheme from among the plurality of possible gas maintenance schemes comprises selecting another conservation gas injection scheme if it is determined that an age of the at least one gas discharge chamber is in a third range, and applying the selected gas injection scheme to the gas discharge system comprises pumping a third amount of the buffer gas into the gas mixture of the at least one gas discharge chamber, the third amount being lower than the first amount but greater than the second amount.

14. The method of claim 13, wherein the first range is a value less than or equal to a lower value, the second range is a value greater than the lower value, and the third range is a value that is greater than an upper value.

15. The method of claim 13, wherein the first range is a first value of the age, the second range is a second value of the age, and the third range is a third value of the age.

16. The method of claim 12, wherein the first range is a first value of the age and the second range is a second value of the age.

17. The method of claim 12, wherein the second range is distinct from the first range.

18. The method of claim 1, wherein:
selecting the gas maintenance scheme from among the plurality of possible gas maintenance schemes comprises selecting a standard gas injection scheme if it is determined that an age of at least one of the gas discharge chambers is in a first range, and applying the selected gas injection scheme to the gas discharge system comprises performing an injection of a buffer gas into the gas mixture of the at least one gas discharge chamber at a first temporal frequency; and
selecting the gas maintenance scheme from among the plurality of possible gas maintenance schemes comprises selecting a conservation gas injection scheme if it is determined that the age of the at least one gas discharge chamber is in a second range, and applying the selected conservation gas injection scheme to the gas discharge system comprises performing an injection of the buffer gas into the gas mixture of the at least one gas discharge chamber at a second temporal frequency that is different from the first temporal frequency.

19. The method of claim 18, wherein the second temporal frequency is less than the first temporal frequency.

20. The method of claim 18, wherein performing an injection of the buffer gas into the gas mixture of the at least one gas discharge chamber also includes injecting one or more components of the gain medium into the gas mixture of the at least one gas discharge chamber.

21. The method of claim 1, further comprising:
monitoring one or more operating characteristics of the gas discharge light source;
determining whether any of the one or more monitored operating characteristics will be out of an acceptable range at a future time; and
if it is determined that any of the one or more monitored operating characteristics will be out of an acceptable range at a future time, then: selecting a restore gas maintenance scheme and applying the selected restore gas maintenance scheme to the gas discharge system.

22. The method of claim 21, wherein applying the selected restore gas maintenance scheme to the gas discharge system comprises applying one or more of a restore injection scheme and a refill scheme to the gas discharge system.

23. The method of claim 22, wherein applying the selected restore injection scheme to the gas discharge system comprises performing an injection of a buffer gas into the gas mixture of at least one of the gas discharge chambers that increases a relative amount of the buffer gas in the gas mixture of the at least one gas discharge chamber.

24. The method of claim 23, wherein performing the injection of the buffer gas into the gas mixture of the at least one gas discharge chamber that increases the relative amount of the buffer gas in the gas mixture of the at least one gas discharge chamber comprises one or more of altering a temporal frequency at which the injection is performed and pumping a different amount of buffer gas into the gas mixture than was pumped before it was determined that any of the one or more monitored operating characteristics will be out of an acceptable range.

25. The method of claim 24, wherein:
altering the temporal frequency at which the injection is performed comprises increasing a frequency at which the injection is performed; and
pumping the different amount of buffer gas into the gas mixture than was pumped before it was determined that any of the one or more monitored operating characteristics will be out of an acceptable range comprises pumping less buffer gas into the gas mixture than was pumped before it was determined that any of the one or more monitored operating characteristics will be out of an acceptable range.

26. The method of claim 1, wherein applying the selected gas maintenance scheme to the gas discharge system occurs after each of the gas discharge chambers is filled with its respective gas mixture.

27. The method of claim 26, further comprising, after the selected gas maintenance scheme is applied to the gas discharge system, performing a refill scheme to the gas discharge chamber, the refill scheme comprising:
emptying each of the gas discharge chambers of the gas discharge system; and
refilling each gas discharge chamber with fresh gas mixture.

28. The method of claim 1, wherein a gas maintenance scheme includes one or more of the following parameters:
an amount of a component gas that is to be pumped into the gas mixture; and
a temporal frequency at which an injection of the component gas into the gas mixture is performed.

29. The method of claim 28, wherein the component gas is a buffer gas of the gas mixture, the gas mixture includes a gain medium.

30. The method of claim 1, wherein one of the gas maintenance schemes is a refill scheme that includes emptying at least one of the gas discharge chambers and refilling that emptied gas discharge chamber with fresh gas mixture.

31. A method of operating a gas discharge light source that includes one or more gas discharge chambers, the method comprising:
filling a gas discharge chamber with a gas mixture, the gas discharge chamber housing an energy source;
supplying a pulsed energy to the gas mixture by activating the energy source to thereby produce a pulsed amplified light beam;
determining one or more properties of the gas discharge chamber;
selecting an injection scheme from among a plurality of possible injection schemes based on the determined one or more properties of the gas discharge chamber; and
applying the selected injection scheme to the gas discharge chamber;
wherein an injection scheme includes one or more parameters related to adding one or more supplemental gas mixtures to the gas discharge chamber.

32. A gas discharge light source comprising:
a gas discharge system that includes one or more gas discharge chambers, each gas discharge chamber housing an energy source and containing a gas mixture that includes a gain medium; and
a gas maintenance system comprising:
a gas supply system;
a monitoring system; and
a control system coupled to the gas supply system and the monitoring system and configured to:
provide a signal to activate each energy source to thereby produce a pulsed amplified light beam from its gas discharge chamber;
receive information from the monitoring system and determine one or more properties of the gas discharge system based on this received information;
select a gas maintenance scheme from among a plurality of possible schemes based on the determined one or more properties of the gas discharge system; and
provide a signal to the gas supply system to thereby apply the selected gas maintenance scheme to the gas discharge system;
wherein a gas maintenance scheme includes one or more parameters related to adding one or more supplemental gas mixtures to the gas discharge chambers of the gas discharge system.

33. The light source of claim 32, wherein the component gas includes a buffer gas and the gas mixture contained within the gas discharge chamber also includes a buffer gas.

34. The light source of claim 33, wherein:
the gain medium includes a noble gas and a halogen;
the buffer gas includes an inert gas; and
the inert gas of the component gas includes an inert gas.

35. The light source of claim 32, wherein the gas discharge system includes a master oscillator having a master oscillator gas discharge chamber providing a seed light beam, and a power amplifier having a power amplifier gas discharge chamber that receives the seed light beam, wherein the one or more gas discharge chambers include the master oscillator gas discharge chamber and the power amplifier gas discharge chamber.

36. The light source of claim 32, wherein the gas supply system includes one or more gas sources and a valve system fluidly connected to both the one or more gas sources and the one or more gas discharge chambers.

37. The light source of claim 36, wherein the one or more gas sources include:
a tri-mix gas source including three gases, wherein the three gases include one or more of: halogen fluorine, a noble gas, and a rare gas; and
a bi-mix gas source including two gases, wherein the two gases include one or more of a noble gas and another gas and lack any fluorine.

* * * * *